United States Patent

Kono et al.

[11] Patent Number: 5,448,119
[45] Date of Patent: Sep. 5, 1995

[54] SPINDLE MOTOR

[75] Inventors: Hisashi Kono, Toyooka; Kenichi Yamazaki; Tsuyoshi Miyawaki, both of Komagane, all of Japan

[73] Assignee: Nagano Nidec Corporation, Nagano, Japan

[21] Appl. No.: 95,277

[22] Filed: Jul. 21, 1993

Related U.S. Application Data

[62] Division of Ser. No. 858,886, Mar. 27, 1992.

[30] Foreign Application Priority Data

Mar. 29, 1991 [JP] Japan ................... 3-89432
Jun. 5, 1991 [JP] Japan ................... 3-51106
Jul. 5, 1991 [JP] Japan ................... 3-191118

[51] Int. Cl.$^6$ .................. H02K 7/14; H02K 7/08; H02K 1/06; H02K 5/24
[52] U.S. Cl. ................... 310/67 R; 310/90; 310/217; 310/51
[58] Field of Search .......... 310/42, 40 MM, 51, 67 R, 310/90, 156, 191, 217, 91; 360/98.07, 98.08, 99.04, 99.05, 99.08, 99.12

[56] References Cited

U.S. PATENT DOCUMENTS

| | | | |
|---|---|---|---|
| 4,658,312 | 4/1987 | Elssser et al. | 360/99.08 |
| 4,730,136 | 3/1988 | Müller | 310/68 R |
| 4,888,511 | 12/1989 | Aoki | 310/91 |
| 4,922,406 | 5/1990 | Schuh | 360/98.07 |
| 5,030,864 | 7/1991 | Van Hout et al. | 310/67 R |
| 5,069,515 | 12/1991 | Itami et al. | 310/90 |
| 5,134,331 | 7/1992 | Miyaji et al. | 310/67 R |
| 5,142,178 | 8/1992 | Kloster et al. | 310/217 |
| 5,177,650 | 1/1993 | Jabbari et al. | 360/99.08 |

FOREIGN PATENT DOCUMENTS

| | | | |
|---|---|---|---|
| 0089838 | 4/1991 | Japan | 310/51 |
| 04215542 | 9/1992 | Japan | 310/51 |

*Primary Examiner*—Clayton E. LaBalle

[57] ABSTRACT

A spindle motor comprising a bracket, a shaft member secured to the bracket, a rotor rotatively supported by the shaft member while interposing bearings a rotor magnet fastened to the rotor and a stator disposed to confront the rotor magnet, wherein the rotor has a hub portion, to which a recording disk is fastened, and a rotor portion, to which the rotor magnet is fastened, the hub portion and the rotor portion being made to be interchangeable. The hub portion has a plurality of female screw holes for fastening the retaining cap, the number of a plurality of the female screw holes being different from the number of ball members of the ball bearing by at least two.

7 Claims, 7 Drawing Sheets

SPINDLE MOTOR

This is a divisional of co-pending application Ser. No. 07/858,886 filed on Mar. 27, 1992.

FIELD OF THE INVENTION

The present invention relates to a spindle motor for use mainly to rotate a disk (a magnetic disk or optical disk) or the like.

DESCRIPTION OF THE PRIOR ART

Generally, a spindle motor has a bracket fastened to a disk drive device and a rotor which is capable of rotating relatively to the bracket, the disk being fastened to the rotor in a predetermined manner. With recent tendency of reducing the overall size and enlarging the capacity of the disk, the dimensions of parts of the spindle motor must be strictly controlled and the rotor must be rotated smoothly.

However, the spindle motor of the type described above encounters the following problems: if the bracket or the rotor is damaged, if a distortion is found in the inspection process, or if the dimension is not included in a predetermined tolerance, the subject bracket or the rotor must be interchanged fully. Therefore, the cost becomes too large.

Furthermore, the spindle motor is constituted in such a way that the disk is fastened to the rotor (hub) by means of a retaining cap. Therefore, the rotor has female screw holes formed therein so as to fasten the retaining cap thereto. However, if a specific portion (a portion which defines the hole for use to fasten the bearing) of the rotor is too thin when the female screw hole is formed, the aforesaid portion sometimes is slightly inwards projected at the position which corresponds to the female screw hole. The projection will deform the outer ring of a bearing to be fitted later, causing the inside portion of the outer ring to be projected. Therefore, if the number of the female screw holes and that of the ball members of the bearing are the same or different by one, all of the ball members sometimes run on to the projection of the outer ring substantially simultaneously. As a result, the smooth rotation of the rotor will be inhibited.

In the spindle motor of the aforesaid type, the interval between the disk fastening surface of the rotor and the fastening reference plane of the frame of the disk drive device must be set to a predetermined value. However, the conventional spindle motor encounters a problem in which the disk fastening surface and the fastening reference plane are affected by the dimensional error of the thickness of the bearing, thereby the interval between the disk fastened to the rotor and a reading/writing head confronting the disk becomes scattered for each spindle motor and therefore the reading/writing operation performed by the disk drive device cannot be completed accurately. In order to overcome the aforesaid problems, it might be feasible to employ a method in which the interval between the disk fastening surface and the fastening reference plane is set to be a longer value and the disk fastening surface is ground after the spindle motor has been assembled so as to make the interval to be within a range of a predetermined allowable tolerance. However, this method arises a problem in that an excessive labor is required to manufacture the spindle motor.

Furthermore, a motor such as the spindle motor has a stator core formed by stacking a plurality of core plates and by coupling them by caulking. However, the caulked portions are undesirably concentrated into a specific phase of the armature coil, causing the following problems to arise: the maximum value of the generated torque becomes scattered and the torque ripple is enlarged excessively.

SUMMARY OF THE INVENTION

A first object of the present invention is to provide a spindle motor having a rotor which can be relatively easily manufactured and a necessity of interchanging overall body of the rotor can be eliminated, if it becomes defective.

A second object of the present invention is to provide a spindle motor capable of smoothly rotating a rotor thereof although the rotor has female screw holes for fastening a retaining cap.

A third object of the present invention is to provide a spindle motor capable of making the interval between the disk fastening surface and the fastening reference plane to be a constant value while eliminating a necessity of grinding the disk fastening surface after the motor has been assembled.

A fourth object of the present invention is to provide a motor capable of enlarging the effective torque while restricting the torque ripple to a low level.

Other and further objects, features and advantages of the invention will be appear more fully from the following description.

DETAILED DESCRIPTION OF THE PREFERRED EMBODIMENTS

Preferred embodiments of the present invention will be described with reference to the drawings.

First, a first embodiment of a spindle motor according to the present invention will now be described with reference to FIGS. 1 and 2.

Figure 1:
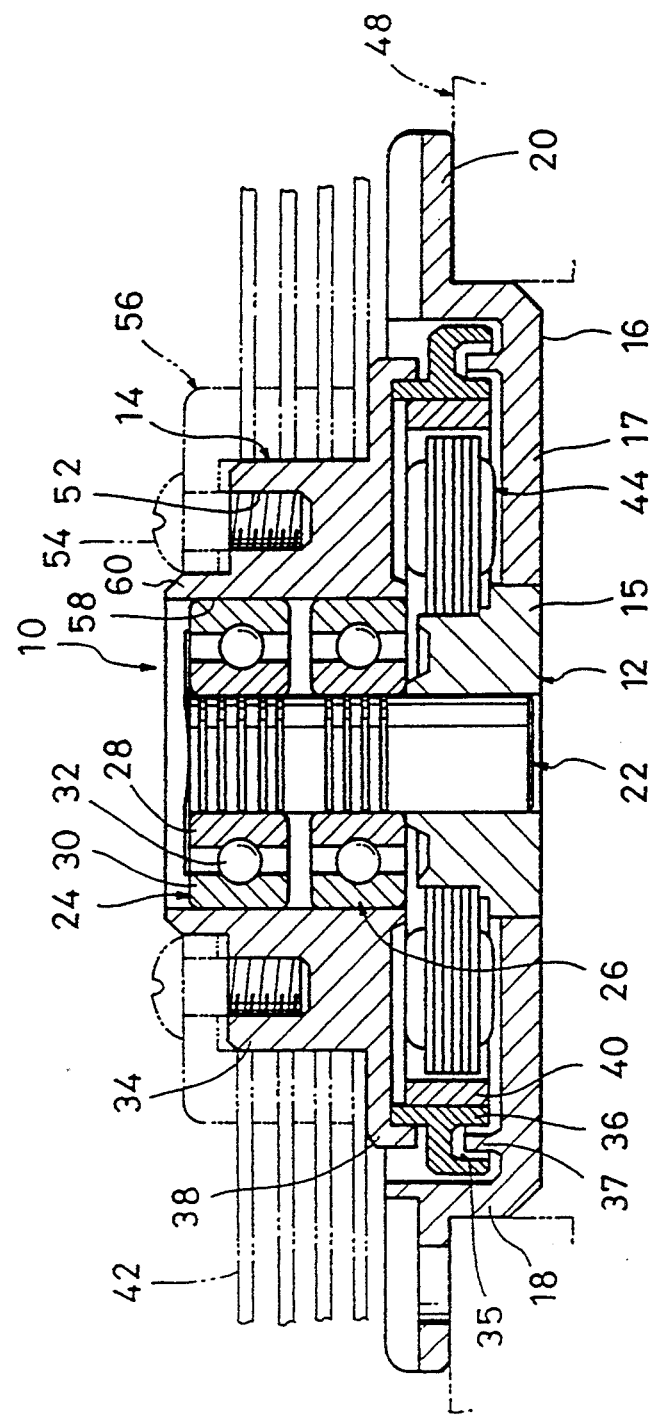
FIG. 1 is a cross sectional view which illustrates a first embodiment of a spindle motor according to the present invention.
Figure 2:
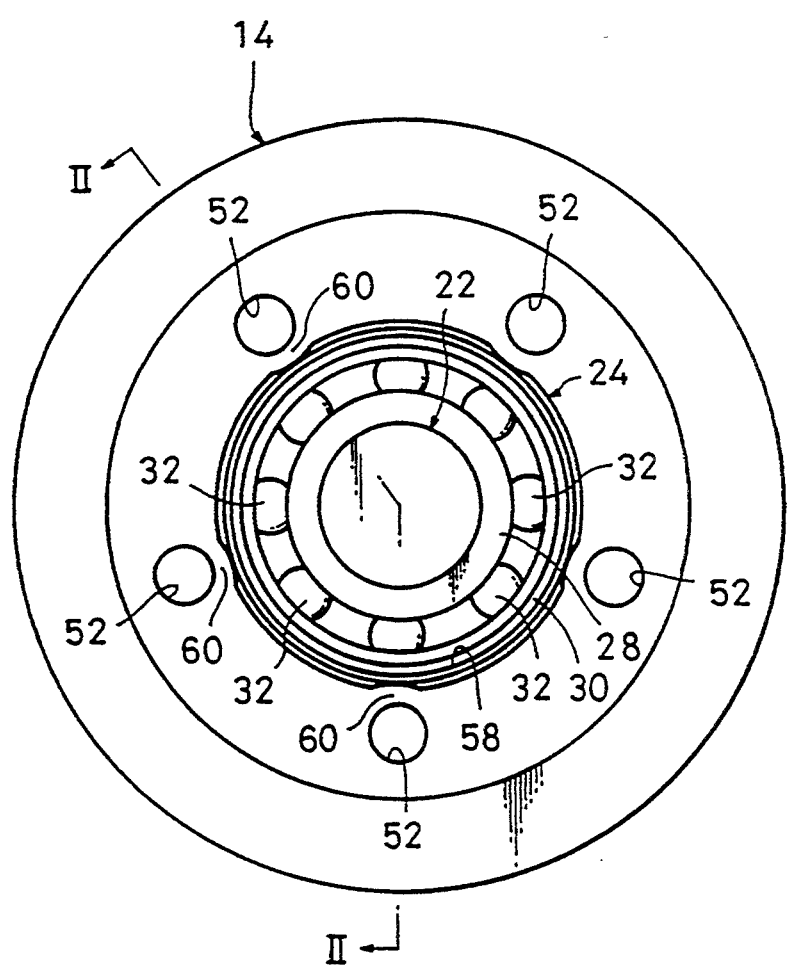
FIG. 2 is a plan view which illustrates the spindle motor shown in FIG. 1.

A spindle motor shown in FIGS. 1 and 2 has a disc-like bracket 12 and a rotor 14 which is able to rotate relatively to the bracket 12. The bracket 12 has a shaft fastening portion 15 and a bracket body 16 fastened to the shaft fastening portion 15. The bracket body 16 has a body 17, an outer wall 18 upwards projecting over the outer portion of the body 16 and a flange 20 outwards extending from the top end portion of the outer wall 18.

A shaft member 22 is secured to the bracket body 16. The rotor 14 is rotatively supported by the shaft member 22 while interposing a pair of ball bearings 24 and 26. The bearing 24 (26) is composed of an inner ring 28, an outer ring 30 and 8 ball members 32. The bearing 24 (26) may be a bearing having rollers (omitted from illustration) in place of the ball members 32.

The rotor 14 has a hub portion 34 and a rotor portion 36. The hub portion 34 is formed into a cylindrical shape and having a flange 38 formed integrally with the lower end portion thereof. The hub portion 34 may be made of aluminum or an aluminum alloy. According to this embodiment, the hub portion 34 is supported by the shaft member 22 while interposing the pair of the bearings 24 and 26. The rotor portion 36 downward extends from the flange 38 of the hub portion 34 and has an annular permanent magnet 40 fastened to the inner surface thereof. The rotor portion 36 may be made of, for example, iron.

As shown in FIG. 1, a plurality of magnetic disks 42 (which constitute a recording disk) are fastened to the outer surface of the hub portion 34 of the rotor 14. Furthermore, a stator 44 is disposed to confront the permanent magnet 40, and is fastened to the bracket 12 (specifically, fastened to the shaft fastening portion 15). In addition, a recessed portion 35 formed in the lower surface of the rotor portion 36 and an annular projection portion 37 formed on the inner surface of the bracket body 16 form a labyrinth seal structure. As an alternative to this, a structure may be employed in which an annular projection portion is formed on the rotor portion 36 and a recessed portion for receiving the annular projection portion is formed in the bracket body 16.

This embodiment has the following characteristics relating to the bracket 12. That is, the bracket 12 is composed of the shaft fastening portion 15, into which the shaft member 22 is press-fitted, and the bracket body 16 fastened to a frame 48 of a drive device. The shaft fastening portion 15 and the bracket body 16 are secured to each other by a means such as press fitting. Therefore, if the bracket 12 is damaged during the assembling process, if a distortion is found in the inspection process, or if the dimension is not included in a predetermined tolerance, the defective part, that is, the shaft fastening portion 15 or the bracket body 16 may be changed. For example, if a distortion is generated in the bracket body 16, the bracket body 16 may be removed from the shaft supporting portion 15 so as be be interchanged with another bracket body 16 having no distortion.

Furthermore, this embodiment has the following characteristics relating to the rotor 14. The rotor 14 is composed of a rotor portion 36, to which the permanent magnet 40 is fitted, and a hub portion 34 to which the disk 42 is fastened. The rotor portion 36 is secured to the hub portion 34 by a means such as press fitting. The portion to be press-fitted is formed into a circular shape whose center is a shaft 12. The rotor portion 36 may be secured by screw-fixing in place of the press fitting.

Therefore, if a defect is taken place, for example, the hub portion 34 is damaged, during the process of assembling the rotor 14, the defective part, that is, the rotor portion 36 or the hub portion 34 may be changed.

In the spindle motor thus structured, if its specification is changed, the required portion may be changed to adapt to the changed specification. For example, if the number of the disks 42 to be fastened is changed, another hub portion 34 having a different length may be used. Therefore, the rotor portion 36 and the permanent magnet 40 can be commonly used. Also the bracket 12 can be commonly used. Another structure may be employed in which the portion to be press-fitted into the shaft member 22 is formed into a unit which is previously manufactured and another portion is assembled to this unit at need.

The spindle motor according to this embodiment has female screw holes 52 formed in the hub portion 34 of the rotor 14 as shown in FIGS. 1 and 2. Five female screw holes 52 are substantially equally spaced in the circumferential direction of the end surface (the top surface when viewed in FIG. 1) of the hub portion 34. Each of the female screw holes 52 extends in the hub portion 34 to reach the substantially central portion in the axial direction of the hub portion 34. By fixing setting screws 54 into the female screw holes 52, a retaining cap 56 can be fastened to the hub portion 34 in a predetermined manner. Therefore, the disk 42 can be held between the flange 38 of the hub portion 34 and the retaining cap 56.

The aforesaid female screw holes 52 and the ball members 28 of the bearing 24 are set to hold the following relationship: 5 female screw holes 52 are formed in the circumferential direction as shown in FIG. 2, 8 ball members 32 of the bearing 24 are substantially equally spaced, and the ball members 28 are rotatively held by a retaining member (omitted from illustration). When the female screw hole 52 is formed, a portion 60 of the hub portion 34 between a hole 58 into which the bearing 24 is press-fitted and the female screw hole 52 is sometimes deformed as shown in FIG. 2 in such a manner that the portion 60 is slightly inwards projected. The tendency of the deformation is in inverse proportion to the thickness of the aforesaid portion 60. If the portions 60 project into the holes 58 into which the bearings 24 are press-fitted, the portions 60 act on the outer ring 30 of each of the bearings 24 and 26 to be press-fitted later. As a result, projections (omitted from illustration) are undesirably formed on the inner surface of the outer ring 30, causing the ball members 32 to move while running on to the projections during the rotation of the rotor 14. However, in the structure according to this embodiment, the number of the female screw holes 52 is smaller than that of the ball members 32 by three. Therefore, all of the ball members 32 do not simultaneously run on to all of the projections. As a result, the smooth rotation of the rotor 14 is not inhibited. The gap formed between the outer ring 24 and the hole 58 into which the bearing 24 is press-fitted is illustrated in an exaggerated manner in FIG. 2 in order to make the description to be understood easily.

Although this embodiment is arranged in such a manner that the number of the female screw holes 52 and that of the ball members 32 of the bearing 24 (26) are different from each other by three, they may be made different by two or more (the number of the female screw holes 52 is larger than that of the ball members 32 by two or more, or the same is smaller by 2 or more), resulting in a desired effect to be obtained.

Then, a second embodiment of the spindle motor according to the present invention will now be described with reference to FIGS. 3 and 4. According to the second embodiment, the interval between the fastening reference plane of the frame and the disk fastening surface of the rotor can be accurately set to a predetermined value.

Figure 3:
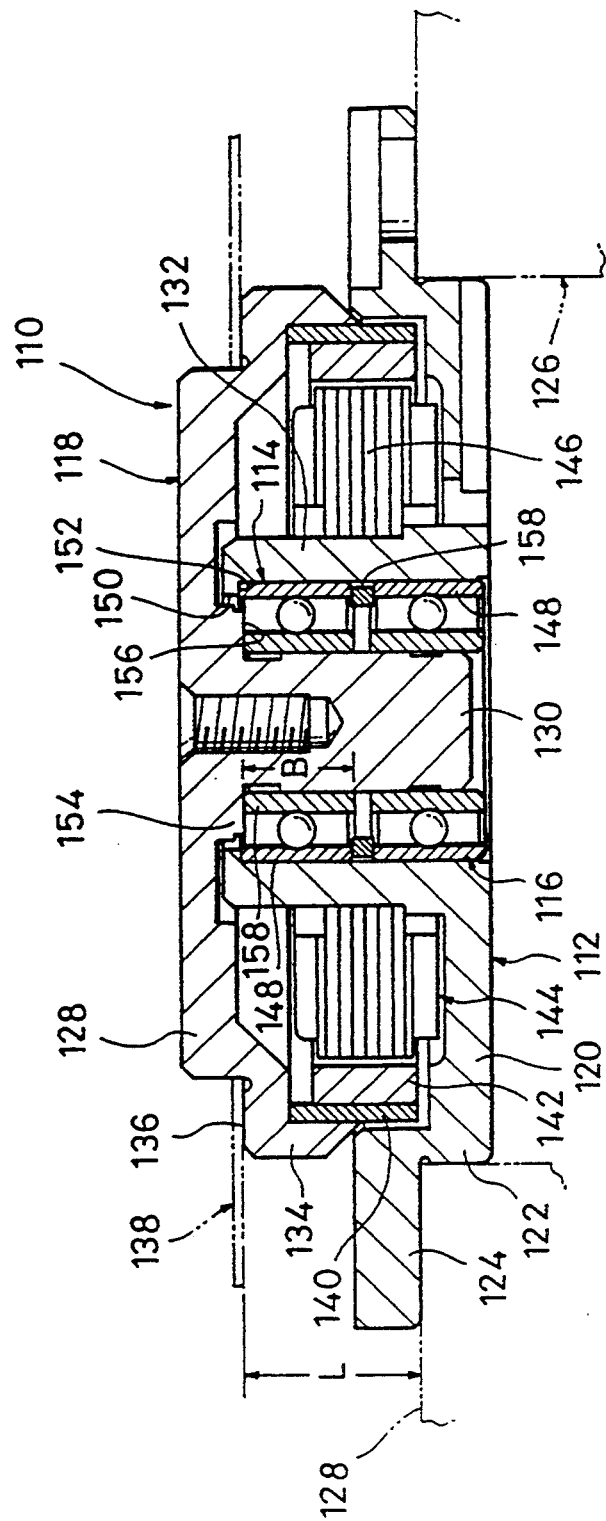
FIG. 3 is a cross sectional view which illustrates a second embodiment of the spindle motor according to the present invention.
Figure 4:
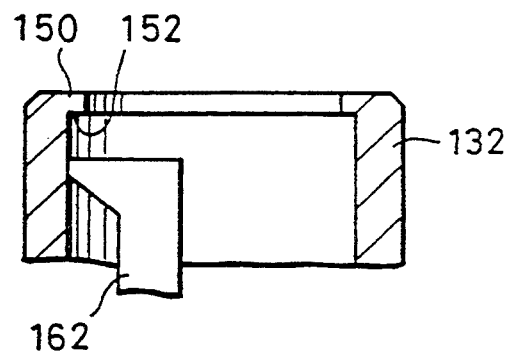
FIG. 4 is a partial cross sectional view which illustrates a method of machining a rotor of the spindle motor shown in FIG. 3.

Referring to FIGS. 3 and 4, a spindle motor 110 has a bracket 112 supported by a disk drive device and a rotor 118 which is rotatively supported by the bracket 112 while interposing a pair of bearings 114 and 116. The bracket 112 has a bracket body 120 formed into a circular shape. The bracket body 120 has, on the outer surface thereof, an outer wall 122 projecting upwards. Furthermore, a flange 124 outwards projecting in the radial direction is integrally formed on the top end portion of the outer wall 122. The flange 124 is placed on a fastening reference plane 128 defined by the top surface of a frame 126 of the disk drive device.

A rotor 118 has a hub portion 128 and a shaft portion 130 integrally formed with the hub portion 128. The bracket 112 has a cylindrical wall portion 132 formed integrally therewith. The cylindrical wall portion 132 supports the shaft portion 130 of the rotor 118 while interposing a pair of bearings 114 and 116. A flange 134 is formed in the hub portion 128 of the rotor 118, the top surface of the flange 134 defining the surface 136 to which a disk 138 is fastened. The disk 138 is mounted on the surface 136. Furthermore, a rotor portion 140 is fastened to the flange 134, and a rotor magnet 142 is fastened to the inner surface of the rotor portion 140. A stator 144 is disposed to confront the rotor magnet 142, the stator 144 having a stator core 146 fastened to the outer surface of the cylindrical wall portion 132 of the bracket 112.

In the structure according to this embodiment, the upper bearing 114 is disposed as follows. That is, a projection 150 inwards projecting in the radial direction is formed on the top end portion of the outer wall 132 of the bracket 112. The inner surface (the lower surface) of the projection 150 defines a first contact surface 152 with which an outer ring 148 is brought into contact. The shaft portion 130, in the base portion thereof, a large-diameter portion 154 having an outer diameter larger than that of its leading portion. The end surface (the lower surface) of the large-diameter portion 154 defines a second contact surface 156 with which an inner ring 158 of the bearing 114 is brought into contact. Furthermore, an annular spacer 158 is interposed between the outer rings of the pair of the bearings 114 and 116.

Since the structure is arranged as described above, the interval L between the fastening reference plane 128 of the bracket 112 and the surface 136 of the rotor 118 to which the disk 138 is fastened is set by brining the end surface of the outer ring 148 of the bearing 114 into contact with the first contact surface 152 of the projection 150 and by bringing the end surface of the inner ring 158 into contact with the second contact surface 156 of the large-diameter portion 145. Therefore, the interval L can be set regardless of the tolerance of the widthwise dimension of the bearing 114. As a result, the interval L is not affected by the tolerance of the thickness B of the bearing 114. Therefore, the dimensional accuracy of the interval L can be improved, and thereby the interval between the disk 138 fastened to the rotor 118 and a reading/writing head (omitted from illustration) which confronts the disk 138 can be set accurately. Furthermore, since the interval L is not affected by the tolerance of the thickness B of the bearing 114, the conventional problem taken place in that the allowable tolerance of the aforesaid interval L is undesirably narrowed can be overcome.

The aforesaid advantages will now be specifically described. In general, the allowable tolerance of the thickness B of a bearing is about 0.04 mm and the allowable tolerance of the aforesaid interval L is about 0.06 mm. The actual allowable tolerance of the aforesaid conventional interval L is narrowed to about 0.02 mm according to the above described values. However, according to the present invention, the allowable tolerance of the aforementioned interval L becomes the above described value (about 0.06 mm) and it not narrowed because it is not affected by the tolerance of the bearing. Therefore, the bracket 112 and the rotor 118 can be easily manufactured and assembled. Furthermore, the additional manufacturing process required for the conventional technology to make the aforesaid interval L to be longer than a predetermined value and to grind the surface to which the disk is fastened for the purpose of making it within a range of a predetermined allowable tolerance can be omitted.

Furthermore, since the structure is constituted as shown in FIG. 3, the conventional necessity of forming the projection on the inner surface of the cylindrical wall portion of the bracket can be eliminated. Therefore, machining of the inner surface of the cylindrical wall portion 132 can be easily machined by using a cutting tool 162 of a lathe as shown in FIG. 4. In addition, since the bearing 114, the spacer 158 and the bearing 116 can be sequentially mounted from an end surface of the cylindrical wall portion 132, the process of assembling the spindle motor can be automated.

Figure 5:
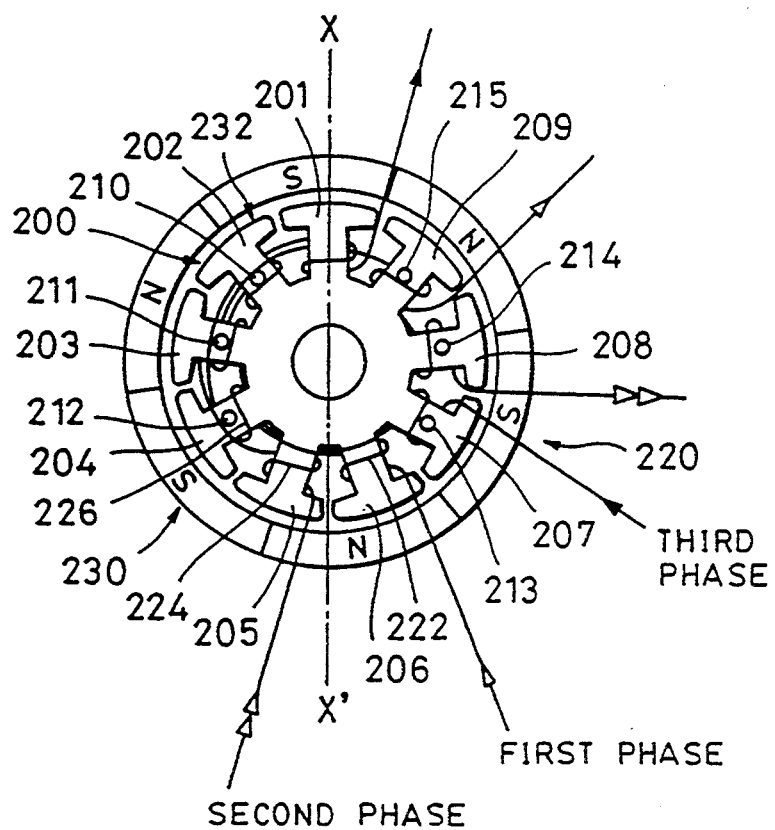
FIG. 5 is a schematic plan view which illustrates a magnetic circuit of the spindle motor shown in FIG. 3.

It is preferable that the stator and the rotor magnet according to the first and the second embodiments be constituted as shown in, for example, FIG. 5.

Referring to FIG. 5, a stator core 200 has 9 teeth portions 201 to 209 spaced substantially equally in the circumferential direction thereof, the adjacent teeth portions 201 to 209 respectively defining 9 slots. The stator core 200 according to this embodiment is formed by coupling 18 core plates (comprising electromagnetic steel plates) the outer diameter of each of which is 18 mm and the thickness of the same is 0.5 mm by a caulking means to be described later.

Referring to FIG. 5, reference numerals 210 to 212 and 213 to 215 represent caulked portions which are coupled to the stator core 200 by caulking. The caulked portions 210 to 215 are formed by pressing substantially the central portion of the corresponding teeth portions in a direction in which the core plates are stacked. Six caulked portions 210 to 215 are formed. The (three) caulked portions are formed in the teeth portions positioned symmetrically with respect to an axial line X-X' (an axial line passing through a specific teeth portion 201 of the stator core 200) which symmetrically bisections the stator core 200 in a radial direction. That is, the caulked portions 210, 211 and 212 are formed in the teeth portions 202, 203 and 204 (in the second, the third and the fourth teeth portions in a counterclockwise direction while letting the specific teeth portion 201 be a first teeth portion), the caulked portions 210, 211 and 212 being formed in the left portion from the axial line X-X' shown in FIG. 5. On the other hand, the caulked portions 213, 214 and 215 are formed in the teeth portions 207, 208 and 209 (in the seventh, the eighth and the ninth teeth portions in a counterclockwise direction while letting the specific teeth portion 201 be a first teeth portion), the caulked portions 213, 214 and 215 being formed in the right portion from the aforesaid axial line X-X'.

The stator core 200 has a coil 220 wound thereto, the coil 220 being driven in a three-phase manner. As shown in FIG. 5, an in-phase coil is, in a homopolar manner (CW: clockwise when viewed from an outer portion of the teeth portion of the stator core 200) wound around three teeth portions spaced in a range of substantially 120°. That is, a coil 222, which is the first phase of the coil 220 is wound around the sixth teeth portion 201, is then wound around the third teeth portion 203 and is then wound around the ninth teeth portion 209 while being connected in series. Also a coil 224, which is the second phase, is sequentially wound around the fifth teeth portion 205, the second teeth portion 202 and the eighth teeth portion 208 while being connected in series. Also the coil 226, which is the third phase, is sequentially wound around the seventh teeth portion 207, the fourth teeth portion 204 and the first teeth portion 201 while being connected in series. Furthermore, the stator core 200 and the coil 220 constitute a stator 232 (an armature).

A rotor magnet 230 formed into a cylindrical shape and serving as an example of a field means is disposed outside the stator 210. The rotor magnet 230 is disposed rotatively in relation to the stator 232 in such a manner that the inner surface of the rotor magnet 230 confronts the outer surface of the stator 232 in a radial direction. The rotor magnet 230 has 6 magnetic poles of alternative polarity type, each of the magnetic poles being substantially equally spaced while making a central angle of 60°. The north poles and the south poles of the rotor magnet 230 shown in FIG. 5 respectively indicate the polarities of the inside portion of the rotor magnet 230.

Then, the state of configuration of the caulked portion 210 to 215 in the stator 232 will now be described with reference to FIG. 5. In relation to the first-phase coil 222, only the sixth teeth portion 206 has no caulked portion, but the third and the ninth teeth portions 203 and 209 have the caulked portions. In relation to the second-phase coil 224, only the fifth teeth portion 205 has no caulked portion, but the second and the eighth teeth portions 202 and 208 have the caulked portions. In relation to the third-phase coil 226, only the first teeth portion 201 has no caulked portion, but the fourth and the seventh teeth portions 204 and 207 have the caulked portions. Therefore, each phase of the coil 220 has a substantially equal inductance, and also the magnetic resistance generated in relation to the rotor magnet 232 becomes substantially the same. Therefore, the torque ripple can be reduced and irregular rotation can also be reduced.

As an example, the torque generated from the magnetic circuit shown in FIG. 5 was measured. In this example, an insulated copper wire having a diameter of 0.18 mm was used and a motor formed by winding 52 turns of the wire per slot was used to carry out an experiment. As a result, torque waves shown in FIG. 6 were obtained. In this case, a maximum torque and a minimum torque of 222.5 g-cm and 162.5 g-cm were generated.

Figure 10:
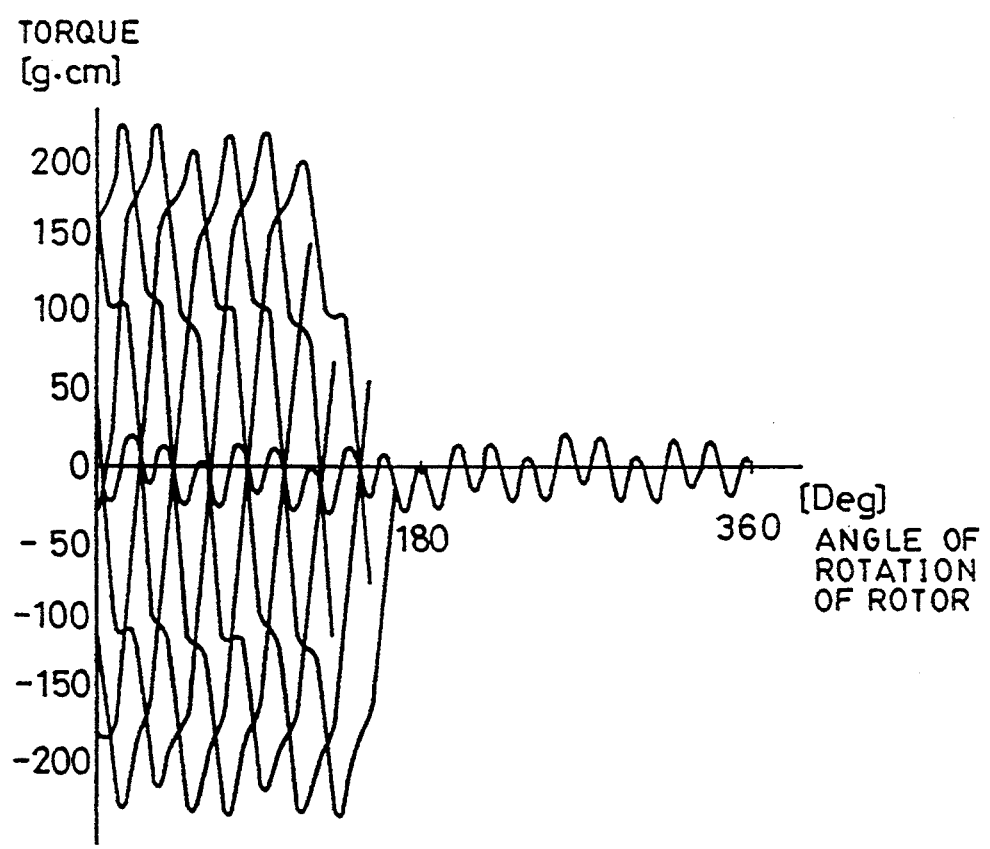
FIG. 10 is a graph which illustrates the relationship between the angle of rotation of the rotor and torque generated from the rotor in a magnetic circuit of a conventional motor.

As a comparative example, an insulated copper wire having a diameter of 0.18 mm was used and a conventional motor (formed substantially similarly to the motor according to the example except for the arrangement in which the first, fourth and the seventh teeth portions have the caulked portions) formed by winding 52 turns of the wire per slot was used to carry out an experiment, resulting in torque waves shown in FIG. 10. In this case, a maximum torque and a minimum torque of 230 g-cm and 153 g-cm were generated.

Figure 6:
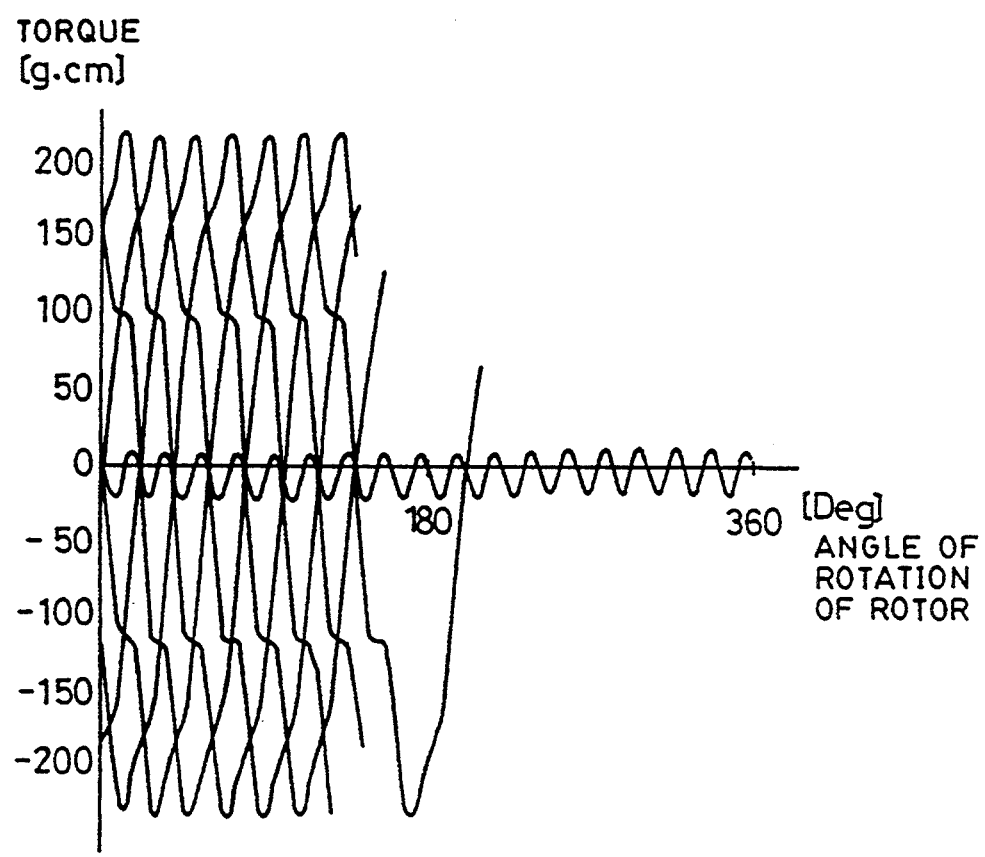
FIG. 6 is a graph which illustrates the relationship between the angle of rotation of the rotor and torque generated from the rotor in a case where the magnetic circuit shown in FIG. 5 is used.

As a result, as compared with the conventional motor, the motor according to the example resulted in a slight reduction in the maximum torque due to the number of the caulked portion but resulted in an improvement in the actual torque thanks to the enlargement of the minimum torque. Furthermore, the irregular rotation was prevented as shown in FIGS. 6 and 10. Another effect could be obtained in that an adverse affection of the distortion of the shape of the stator core can be eliminated satisfactorily because the caulked portions are disposed in the peripheral portion of the stator core in a dispersed manner.

Figure 7:
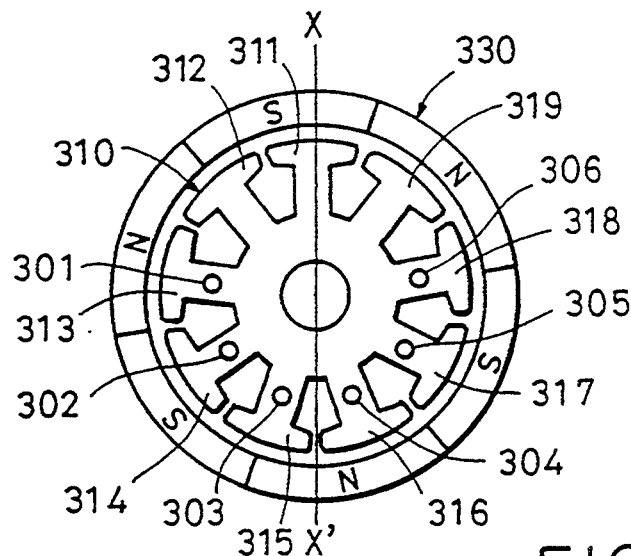
FIG. 7 is a schematic plan view which illustrates a first modification of the magnetic circuit.

FIG. 7 illustrates a first modification of the magnetic circuit for use in the motor shown in FIG. 6. Since the structures are substantially the same as those shown in FIG. 6 except for the configuration of the caulked portions, description will be made about the configuration of the caulked portions.

According to the first modification shown in FIG. 7, left caulked portions 301, 302 and 303 from line X-X' are formed in teeth portions 313, 314 and 315 (the third, the fourth and the fifth teeth portions counted counterclockwise while letting a specific teeth portion 311 be a first teeth portion) of a stator core 310. Right caulked portions 304, 305 and 306 from the line X-X' are formed in teeth portions 316, 317 and 318 (the sixth, the seventh and the eighth teeth portions counted counterclockwise while letting a specific teeth portion 311 be a first teeth portion). The left caulked portions 301, 302 and 303 and the right caulked portions 304, 305 and 306 are disposed symmetrically with respect to the line X-X'. Furthermore, the stator core 310 is disposed in the rotor magnet 330.

Figure 8:
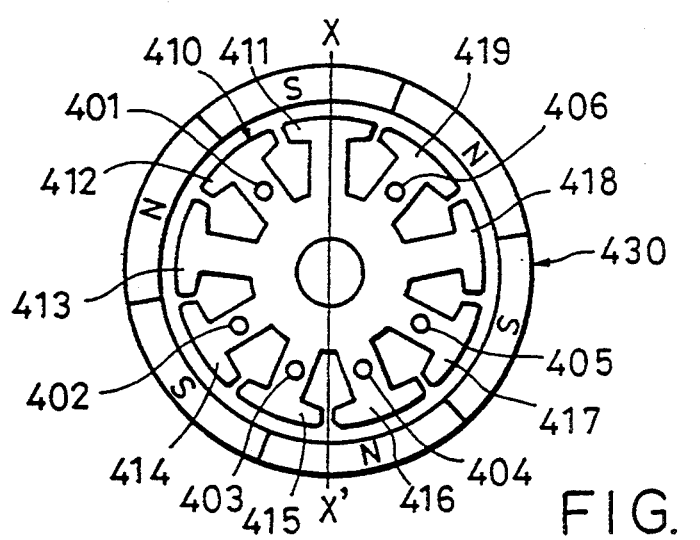
FIG. 8 is a schematic plan view which illustrates a second modification of the magnetic circuit.

A second modification is shown in FIG. 8, in which left caulked portions 401, 402 and 403 from line X-X' are formed in teeth portions 412, 414 and 415 (the second, the fourth and the fifth teeth portions counted counterclockwise while letting a specific teeth portion 411 be a first teeth portion) of a stator core 410. Right caulked portions 404, 405 and 406 from the line X-X' are formed in teeth portions 416, 417 and 419 (the sixth, the seventh and the ninth teeth portions counted counterclockwise while letting a specific teeth portion 411 be a first teeth portion). The left caulked portions 401, 402 and 403 and the right caulked portions 404, 405 and 406 are disposed symmetrically with respect to the line X-X'.

Figure 9:
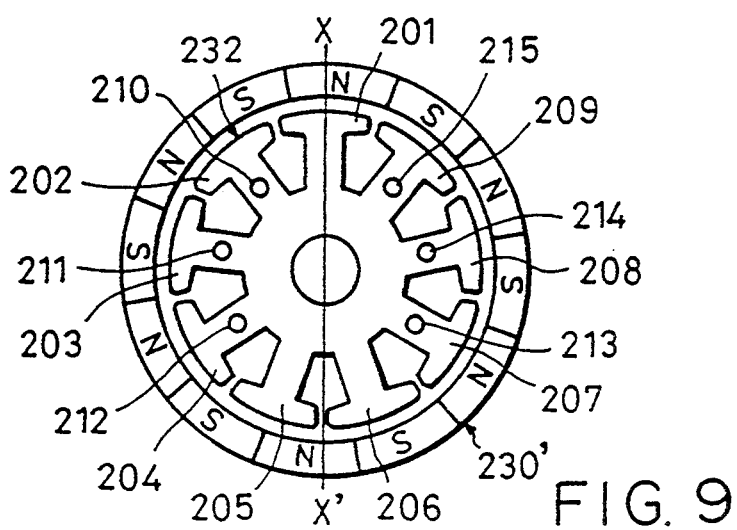
FIG. 9 is a schematic plan view which illustrates a third modification of the magnetic circuit.

According to a third modification shown in FIG. 9, a rotor magnet 230' has 12 magnetic poles substantially equally spaced in the circumferential direction thereof. The other structures are substantially the same as those according to the embodiment shown in FIG. 5.

Also according to the first to the third modifications, the caulked portions are disposed symmetrically with respect to the axial line which passes through a specific magnetic pole portion similarly to the above described embodiments. Therefore, the torque ripple can be prevented and also the effective torque can be improved.

Although the spindle motor according to the invention has been described in its preferred form, it is understood that the present disclosure of the preferred form has been changed in the details of construction and the combination and arrangement of parts may be resorted to without departing from the spirit and the scope of the invention as hereinafter claimed.

We claim:

1. A spindle motor comprising a bracket, a shaft member secured to said bracket, a hub which can be rotated relatively to said shaft member and a pair of ball bearings interposed between said shaft member and said hub to which a recording disk is fastened by a retaining cap, wherein said hub has a plurality of female screw holes for fastening said retaining cap, said pair of bearings have inner rings, outer rings and ball members disposed therebetween respectively, and the number of said female screw holes being smaller than the number of said ball members of said ball bearing by at least two.

2. A spindle motor according to claim 1, wherein the number of a plurality of said female screw holes is smaller than the number of said ball members of said ball bearing by at least three.

3. A spindle motor according to claim 1, wherein said hub has a hub portion to which said recording disk is fastened and a rotor portion to which a rotor magnet is fastened, said hub portion is rotatively supported by a shaft member secured to said bracket while interposing said ball bearing and a plurality of said female screw holes are formed in said hub portion.

4. A motor comprising an armature having nine tooth portions equally spaced circumferentially with three-phase coils wound around said nine tooth portions, and field means in which six or twelve south poles and north poles are alternately substantially equally spaced circumferentially and which can be rotated relatively to said armature, wherein said armature has a core formed by stacking a plurality of core plates and by coupling, six tooth portions among nine tooth portions of said core have caulked portions, said six caulked portions being symmetrically disposed with respect to an axis which passes through a specific tooth of said armature, and two caulked portions being disposed to two tooth portions among three tooth portions wound around one of said three-phase coils.

5. A motor according to claim 4, wherein said caulked portions are respectively formed in a second, third, fourth, seventh, eighth and the ninth teeth portions while letting said specific teeth portion be a first teeth portion.

6. A motor according to claim 4, wherein said caulked portions are respectively formed in a third, fourth, fifth, sixth, seventh and eighth teeth portions while letting said specific teeth portion be a first teeth portion.

7. A motor according to claim 4, wherein said caulked portions are respectively formed in a second, fourth, fifth, sixth, seventh, and the ninth teeth portions while letting said specific teeth portion be a first teeth portion.

* * * * *